United States Patent [19]

Shigeta et al.

[11] Patent Number: 5,153,840
[45] Date of Patent: Oct. 6, 1992

[54] DEVICE FOR CREATING REVERSE STITCHING DATA FOR A SEWING MACHINE

[75] Inventors: Katsunori Shigeta; Haruyuki Nakamura, both of Aichi, Japan

[73] Assignee: Mitsubishi Denki K.K., Tokyo, Japan

[21] Appl. No.: 579,644

[22] Filed: Sep. 10, 1990

[30] Foreign Application Priority Data

Sep. 11, 1989 [JP] Japan .................................. 1-232710

[51] Int. Cl.⁵ ........................ G06F 15/46; D05B 21/00
[52] U.S. Cl. ............................... 364/470; 112/121.11; 112/121.13
[58] Field of Search ................ 364/470, 191, 192; 112/112.11, 112.12, 112.13, 451, 454, 455, 456

[56] References Cited

U.S. PATENT DOCUMENTS

| | | | |
|---|---|---|---|
| 4,104,976 | 8/1978 | Landau, Jr. et al. | 112/121.11 |
| 4,223,616 | 9/1980 | Kunimatsu et al. | 112/458 |
| 4,345,532 | 8/1982 | Eguchi | 112/158 E |
| 4,372,232 | 2/1983 | Dunn et al. | 112/453 |
| 4,590,880 | 5/1986 | Makabe et al. | 112/445 |
| 5,005,500 | 4/1991 | Kato et al. | 364/470 |
| 5,009,176 | 4/1991 | Shigeta et al. | 364/470 |

FOREIGN PATENT DOCUMENTS

| | | |
|---|---|---|
| 0051573 | 5/1982 | European Pat. Off. |
| 91 | 1/1984 | Japan . |
| 148583 | 8/1985 | Japan . |
| 148584 | 8/1985 | Japan . |
| 244091 | 10/1988 | Japan . |
| 2009961 | 6/1979 | United Kingdom . |

*Primary Examiner*—Jerry Smith
*Assistant Examiner*—Paul Gordon
*Attorney, Agent, or Firm*—Sughrue, Mion, Zinn, Macpeak & Seas

[57] ABSTRACT

A device for creating stitching data for use by a sewing machine includes a tablet digitizer having a pattern entry area and menu area for which data for a stitching pattern in a forward direction is entered by a cursor. The data entry device operates in conjunction with a storage, under CPU control, to store the input stitching data in an input order. Reverse stitching data is generated automatically from the input data by an apparatus which is operative to read the forward direction stitching data in reverse order, analyze the content of the data, translate the identified data into reverse stitching data and write the reverse stitching commands into memory. The forward stitching data and automatically generated reverse stitching data are stored in a ROM for use by the sewing machine.

8 Claims, 7 Drawing Sheets

REPEATED FOR n = 1 TO 19

FIG. 8

DEVICE FOR CREATING REVERSE STITCHING DATA FOR A SEWING MACHINE

FIELD OF THE INVENTION

This invention relates to a device for creating stitching data for an electronic sewing machine equipped with an XY table and driven in accordance with stitch position data.

BACKGROUND OF THE INVENTION

Industrial sewing machines put to practical use include an automatic sewing machine which automatically sews a fabric according to a predetermined stitching pattern by driving the fabric or the needle thereof in accordance with preprogrammed stitching information retained in a storage device. The stitching information is held on a storage medium in the storage device, which medium can be changed to ensure ease of sewing different stitching patterns. A semiconductor memory, a magnetic card or the like is generally employed as a storage medium, and contains control information on how the sewing machine will operate according to the sequence of stitching operations. The control information generally includes control commands such as relative displacement between the needle and the fabric, stitching velocity and other parameters per stitch of the stitching pattern. The control information for one stitching pattern is a set of such control commands per stitch.

To perform automatic sewing of a desired stitching pattern on an automatic sewing machine, therefore, it is necessary to create control data corresponding to that stitching pattern and store it on a predetermined storage medium.

FIG. 4 is a perspective side view of a prior art stitching data creating device for a sewing machine 1, as shown in the Japanese patent disclosure bulletin No. 1985-148582. In front of the device is a tablet digitizer 10 having a menu area 11 and a pattern entry area 13 for data entry. A cursor 12 is used to select required items from the menu area 11 and to obtain coordinate data from the pattern entry area 13. On the face of the device is an LED display panel 20, having various switches and LEDs, a CRT 26 for displaying pattern data and an integrated circuit (IC) socket 18. The socket is designed to receive an IC PROM cassette as a storage medium for receiving the stitching data for later read-out. An eraser 8 is used for bulk erasing of the stitching data written on the PROM.

FIG. 5 is a block diagram illustrating a hardware configuration of the device. A bus 15 forms a common communication path for the system and connects a CPU 14 to the tablet digitizer 10, via an interface 48, as well as to storage devices, including ROM 22 and RAM 24. The bus 15 also connects to a display subsystem at interface 32, the subsystem including a CRT display 26, DMA controller 30 and storage RAM 28. The bus 15 also interfaces to a combination PROM write device 16/LED display unit 20 which loads a PROM cassette useable for controlling the operation of a sewing machine 38 via controller 40.

Operation of the device shown in FIG. 4 will now be described. Various modes and operating procedures are identified on the menu area 11 and are selectable by the cursor 12 in order to specify the control parameters for a stitching operation. Once in the data input mode, the relevant modes and operating procedures for data input are displayed on the LED display panel 20 as I/0 data via the interface 44. By drawing a desired stitching pattern on the tablet digitizer 10 by means of a cursor 12, stitching pattern data is written as pattern data signals by the PROM write device 16 onto a PROM cassette 42 via an interface 44 under control of CPU 14. When the loaded PROM cassette 42 is installed in a sewing machine controller 40, the sewing machine 38 can be driven to sew a predetermined pattern.

The PROM cassette 42 is installed into a PROM cassette socket 18, as shown in FIG. 4. A program for writing input data from the tablet digitizer 10 into the PROM via an interface 48 and under control of the CPU 14 is stored in ROM 22, and the CPU 14 performs processing in accordance with that program. The input stitching pattern data from the tablet digitizer 10 is temporarily stored in a data memory RAM 24. This data is stored as relative value data which indicates the X-Y coordinate data of the tablet digitizer 10 in terms of X-Y variations of each stitch.

The CRT monitor 26 is provided to monitor the writing of data from the tablet digitizer 10 into the PROM 16. The stitching pattern data in the data memory RAM 24 is converted into picture displaying data by the CPU 14 and is stored in a picture data memory RAM 28 via an interface 32 on bus 15. When digital values in RAM 28 are converted into analog values (voltages) by D/A converters 34 and 36, a stitch pattern figure is displayed on the CRT 26 by a CRT control circuit 46. This enables an operator to enter data while simultaneously checking that data as a picture.

A specific entry operation will now be described in accordance with FIG. 6 which shows an example of a stitch pattern. First, a home position P1 of the pattern on the tablet digitizer 10 is specified by means of the cursor 12. In practice, this point will correspond to a mechanical origin of the XY table of the industrial sewing machine, not illustrated.

Then, by selecting a key for creating non-stitching feed data on the tablet digitizer 10 and specifying a point P2, non-stitching data is created along a straight line $\overline{P1\ P2}$. Then, a key for creating stitching data is selected and points P3, P4, ..., P9 and P10 are specified to create stitch data. After selecting the non-stitching data creation key again at point P10, point P11 is specified, thereby creating non-stitching data along $\overline{P10\ P11}$. Further, after entering stitching points P12, P13, ..., and P19 in a similar manner, appropriate keys are selected for creating trimming data and end data to complete creation of the stitch data.

In the above entry operation, thread trimming data is automatically created at any point of switching from stitch data to non-stitching data, e.g., at the point of switching from the straight line $\overline{P9\ P10}$ to $\overline{P10\ P11}$.

FIG. 7 is a flow chart indicating the above operation for creating sewing data. Initially, a switch on the cursor 12 is checked for the ON state (step S1). If ON, an XY coordinate value of the point P1 is read (S2) and stored in the data memory RAM 24 (S3), and that value is further converted into stitch data of the sewing machine and stored in the data memory RAM 24 (S4). Thereafter points P2, P3, P4, ..., and P19 are operated upon in a similar manner.

FIG. 8 illustrates an example of the content of the data memory RAM 24 storing the stitch pattern data shown in FIG. 6. Referring to FIG. 8, $(x_1, y_1)$, $(x_2, y_2)$, $(x_3, y_3)$, ..., and $(x_{19}, y_{19})$ indicate areas storing data read from the tablet digitizer 10. Similarly, $(x_{1a}, y_{1a})$, $(x_s, y_s)$, $(x_{2a}, y_{2a}), \ldots, (x_{17a}, y_{17a})$, $(x_{18a}, y_{18a})$, $(x_t, y_t)$, and $(x_e, y_e)$ indicate data as converted into stitching data for the sewing machine. $(x_1, y_1), \ldots,$ and $(x_{19}, y_{19})$ are absolute value data read from the tablet digitizer 10, and $(x_{1a}, y_{1a}), \ldots,$ and $(x_{18a}, y_{18a})$ are relative value data calculated by the following expression:

$$x_{na} = x_{n+1} - x_n$$

$$y_{na} = y_{n+1} - y_n$$

where, $n = 1, 2, 3, \ldots, 17, 18$

The converted stitch data includes data sets $(x_s, y_s)$ and $(x_t, y_t)$ and that of $(x_e, y_e)$. Data $(x_s, y_s)$ is a two-byte start datum added when non-stitching data is switched to the stitch data, data $(x_t, y_t)$ is thread trimming data for trimming the thread used in stitching, and data $(x_e, y_e)$ is a two-byte end datum added to the end of the input data.

When operated according to this stitch pattern data, the electronic sewing machine stitches from P1 to P2 to P3 ... P18 to P19, then returns from P19 to P1, to start the next stitching run. If the retraced distance from P19 to P1 is long in this case, a lot of time will be lost in the stitching work, resulting in inefficiency. To improve working efficiency, a first stitching operation from P1 to P2 to P3 ... P18 to P19 is performed and sewing is temporarily stopped here. Then the object to be sewn is changed and a second stitching operation from P19 to P18 to P17 ... P2 to P1 is performed.

An example of a data entry for enabling such reverse sewing of the stitch pattern shown in FIG. 6 will now be described in reference to FIG. 9. Initially, P1 to P2 to P3 ... P18 to P19 are entered in a manner illustrated in FIG. 6. Data for temporarily stopping the electronic sewing machine (a halt code) is entered at P19. Then P20 to P21 to P22 ... P35 to P36 to P37 are entered in correspondence with P18 to P17 to P16 ... P3 to P2 to P1 by tracing the pattern backwards. At the final point, P37, end data indicating the end of the stitch pattern data is entered.

FIG. 10 shows an example of the contents of the data memory RAM 24 when the entire stitch pattern in FIG. 9 has been entered point by point by the operator. The contents of the RAM 24 include data for each of points P1-P37, converted into the stitch data of the sewing machine. A data set $(x_p, y_p)$ in FIG. 10 indicates the halt code for temporarily stopping the electronic sewing machine at point P19.

When manually entering the stitch pattern data shown in FIG. 9, for example, data in strict correspondence with the previously input points P18, P17 ... and P1 must be entered as the points P20, P21, ... P37. However, it is extremely difficult to do this because of the large number of input points P18, P17, ... and P1 and the inaccuracy of manual operation (the cursor is generally operated by hand).

An attempt to make a straightforward substitution of the data for points P1-P19 to create data for points P19-P37 would result in errors. FIG. 11 shows data obtained by replacing the $(x_e, y_e)$ datum of the stitch data in FIG. 7 with the halt datum $(x_p, y_p)$ and simply reversing the order of the remaining data. Comparison between FIG. 11 and the correct reverse stitch data in FIG. 10 indicates that the thread trimming datum $(x_t, y_t)$ and the start datum $(x_s, y_s)$ are generated at incorrect positions.

Accordingly, it is an object of the present invention to reduce operator input for reverse stitching data.

It is a further object of the present invention to automatically generate reverse stitching data from forward input stitching data in a reverse stitching data generation operation.

It is yet another object of the present invention to overcome the disadvantages in the prior art by providing reverse stitching data, automatically generated on the basis of one-way stitching data.

SUMMARY OF THE INVENTION

The stitching data creating device of the present invention includes: data storage for storing forward direction stitch data and control data; a data reader for reading forward direction data in reverse order, beginning with the final forward direction data in the storage; an analyzer for judging that the data read from the reader is any of start data, thread trimming data, stitch data and vacant data; a data converter for converting the stitch data into reverse stitching data; and a data writer for storing the data converted by the data converter into the storage in proper order.

The data converter includes a first converter for converting forward direction end data from the storage into halt data; a second converter for converting the read data into thread trimming data when the read data is judged to be start data by the analyzer; a third converter for converting the read data into start data when the read data is judged to be thread trimming data; a fourth converter for changing the sign of the read data into their opposite settings when the read data is judged to be stitch data; and a fifth converter for generating end data when the read data is judged to be vacant data.

BRIEF DESCRIPTION OF THE DRAWINGS

FIG. 8 shows how the pattern illustrated in FIG. 7 is stored in a data memory.

In the foregoing drawings, like reference characters designate like or corresponding parts throughout the several views.

DESCRIPTION OF THE PREFERRED EMBODIMENTS

An embodiment of the present invention will now be described with reference to the drawings.

Figure 1:
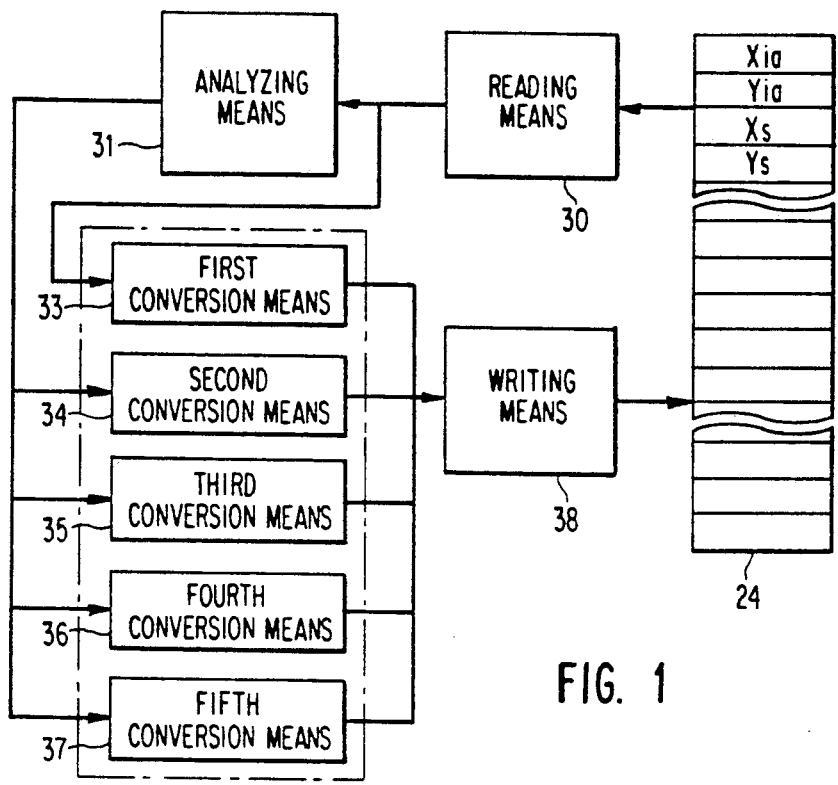
FIG. 1 is a conceptual view of a stitching data creating device for a sewing machine according to one embodiment of the present invention.

FIG. 1 is a conceptional view of a stitching data creating device for a sewing machine according to an embodiment of the present invention. In FIG. 1, a data memory RAM 24 (hereinafter referred to as the "RAM") is used to store stitch data for use in a sewing operation conducted by machine 38. A memory reader 30 is connected to RAM 24 and is operative to read the RAM data in reverse order. A data analyzer 31 is operative to receive the reversely read data from reader 30 and to analyze the data read by the reader 30 and identify its content.

A data converter 32 is connected to receive both the reversely read data from reader 30 and the data type identified by analyzer 31. The data converter 32 has first to fifth data conversion modules 33–37 (which may be implemented in hardware or software). The first conversion module 33 converts end data read by the reader 30 into halt data. The second conversion module 34 converts the reversely read data into thread trimming data when that data is identified as start data by the analyzer 31. The third conversion module 35 converts the reversely read data into start data when that data is identified as thread trimming data. The fourth conversion module 36 changes the signs of the reversely read data to their opposite settings when the data is identified as stitch data (stitch position data) by the analyzer 31. The fifth conversion module 37 generates end data when the reversely read data is identified as vacant data. The outputs of the several modules in converter 32 are connected in common to a data writer 38, which writes the data converted by the data converter 32 into the RAM 24 in a forward direction. In this manner, reverse stitching data can be created and entered automatically into RAM 24 for control of a reverse stitching operation.

Entry of the stitch pattern shown in FIG. 9 will now be described with reference to the flow charts in FIG. 2 and FIG. 3.

Figure 2:
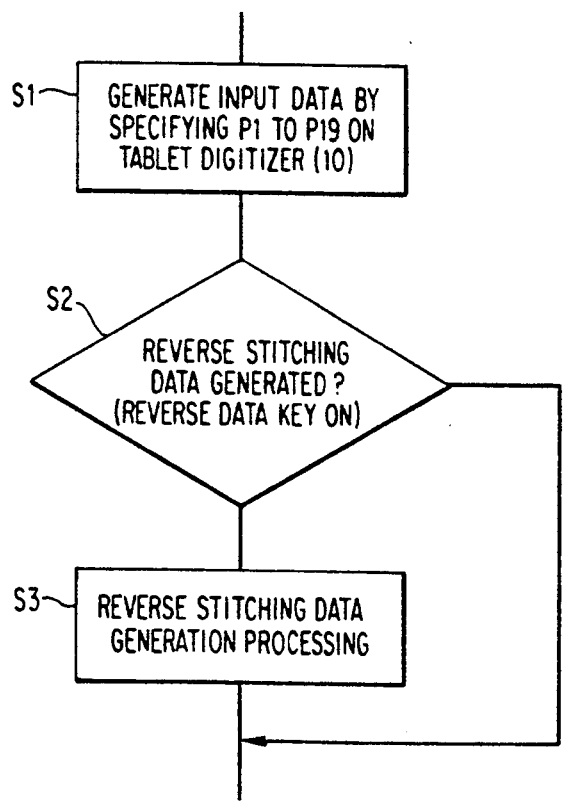
FIG. 2 is a flow chart indicating a general sequence of operations of the embodiment of FIG. 1.

FIG. 2 is a flow chart indicating the general sequence of operations in the embodiment of the present invention. In a first step S1, operating in a manner similar to that of the prior art device, input coordinate points P1, P2, ..., P18 and P19 are specified on the tablet digitizer 10 by means of cursor 12 to generate forward direction stitch data shown in FIG. 9. Then, in a second step S2, a determination is made of whether or not to generate reverse stitching data. If the "REVERSE DATA" key provided in the menu area 11 has not been switched ON, the operation branches to NO and progresses to the next process without generating the reverse stitching data. If the key has been switched ON, the operation branches to YES and proceeds to step S3 for generating the reverse stitching data.

Figure 3:
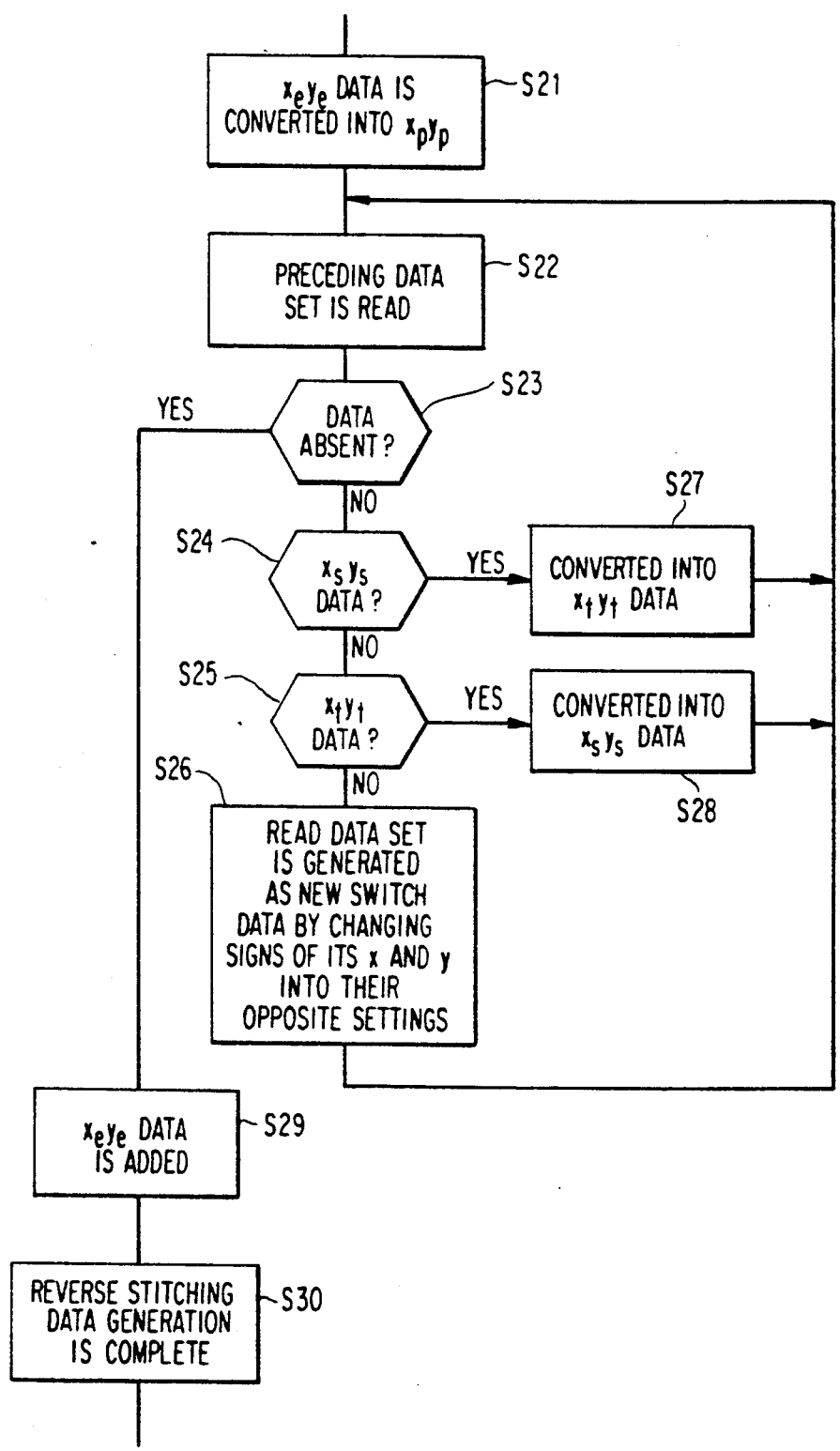
FIG. 3 is a flow chart indicating details of reverse stitching data creation processing in the flowchart shown in FIG. 2.
Figure 11:
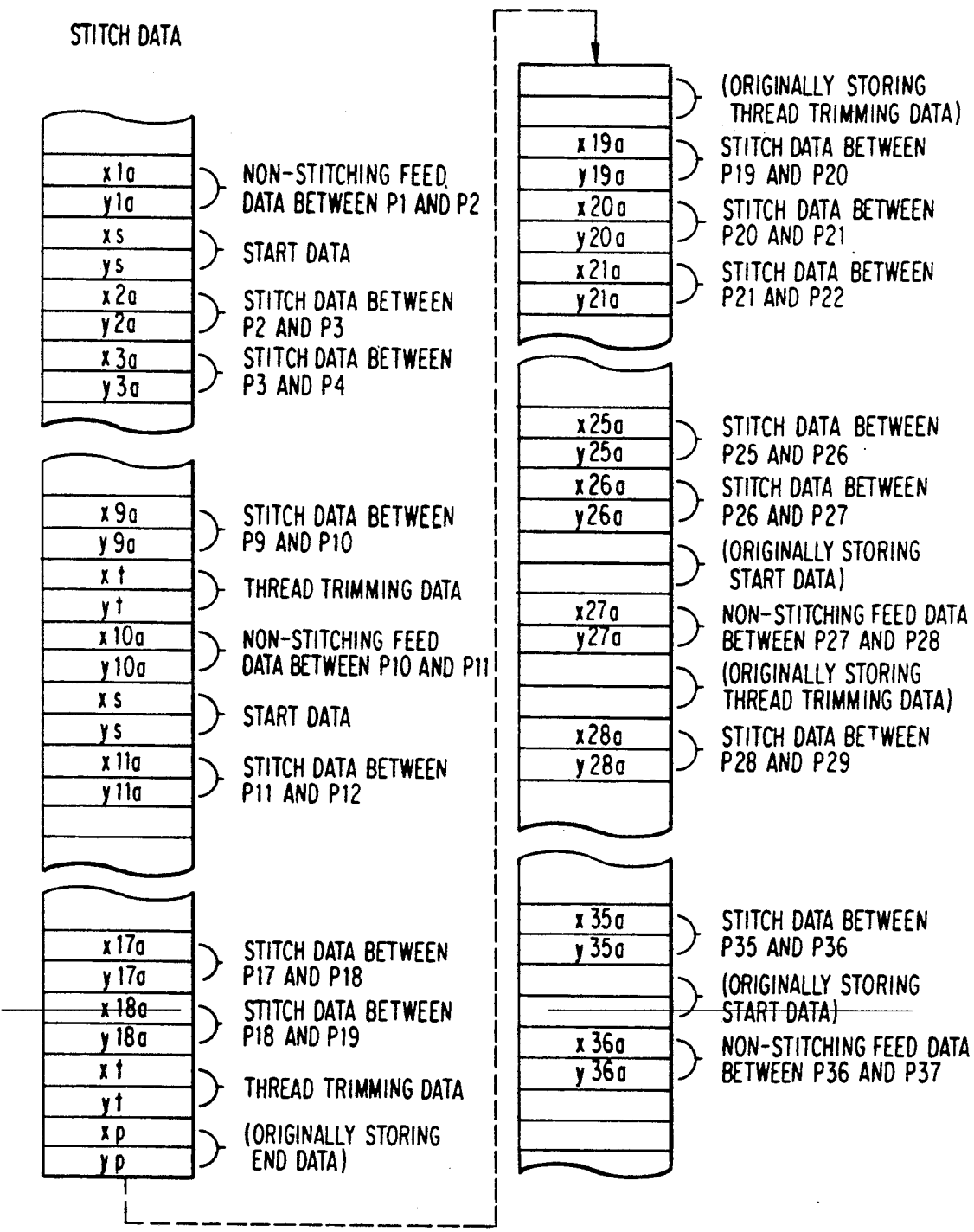
FIG. 11 shows how the pattern in FIG. 8 is stored in the RAM when the stitch data thereof has simply been reversed.

FIG. 3 is a flow chart indicating the details of the reverse stitching data generation process, which will be described in detail in reference to FIG. 8, FIG. 9 and FIG. 11.

Figure 8:
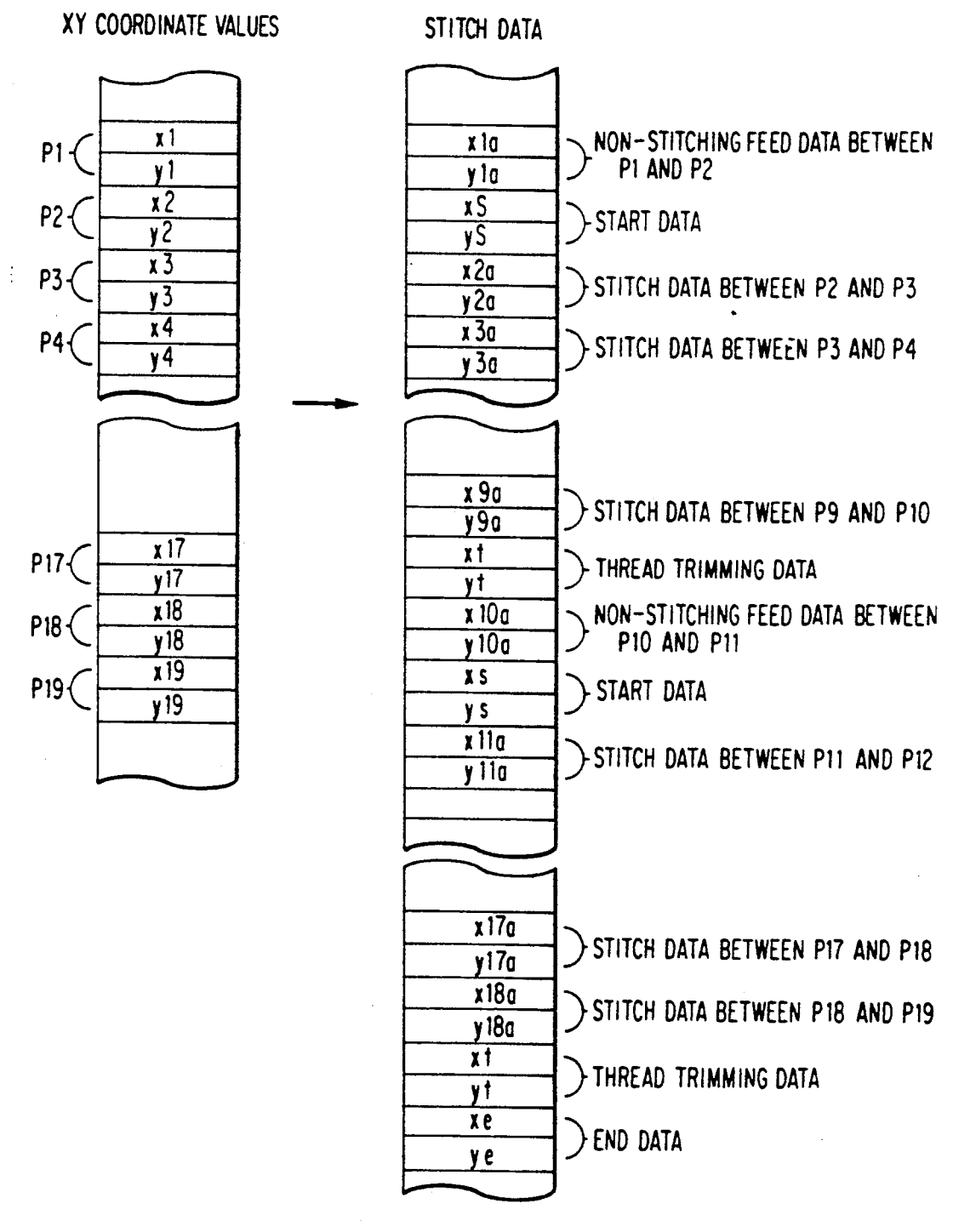

Initially, assume that forward stitch data ($x_{1a}$, $y_{1a}$) to $X_e$, $y_e$) in FIG. 8 has been generated by the operation processing of step (S1) in FIG. 2 and stored in the RAM 24. This data would control the progress of the stitching operation from point P1 to point P19 in FIG. 9.

If the "REVERSE DATA" key has been switched ON, a reverse data generation process begins. First, at step S21, the reader 30 reads data stored at the final position of the pattern on the RAM 24, i.e. a set of end data ($x_e$, $y_e$), the first conversion module 33 then converts that data into a halt code ($x_p$, $y_p$) and the writer 38 writes it in the RAM 24, as shown in the flow chart in FIG. 3. Then, in step S22 the preceding data set, i.e. data set ($x_t$, $y_t$) in the example in FIG. 8, is read by the data reader 30. The analyzer 31 judges whether or not the read data is vacant (S23). If data exists, the operation branches to NO and a determination is made in step S24 of whether or not that data is the start data ($x_s$, $y_s$). Since the data is not the start ($x_s$, $y_s$) in this example, the operation branches to NO and progresses to the next step (S25), for a determination of whether or not the read data is thread trimming data ($x_t$, $y_t$). Since the thread trimming data ($x_t$, $y_t$) has been read in this example, the operation branches to YES, and in step S28 the third conversion module 35 converts that thread trimming data ($x_t$, $y_t$) into the start data ($x_s$, $y_s$), and the data writer 38 writes it into the RAM 24. Then, the operation returns to step S22 and the reader 30 reads the further preceding data set ($x_{18a}$, $y_{18a}$) from the RAM 24.

Figure 10:
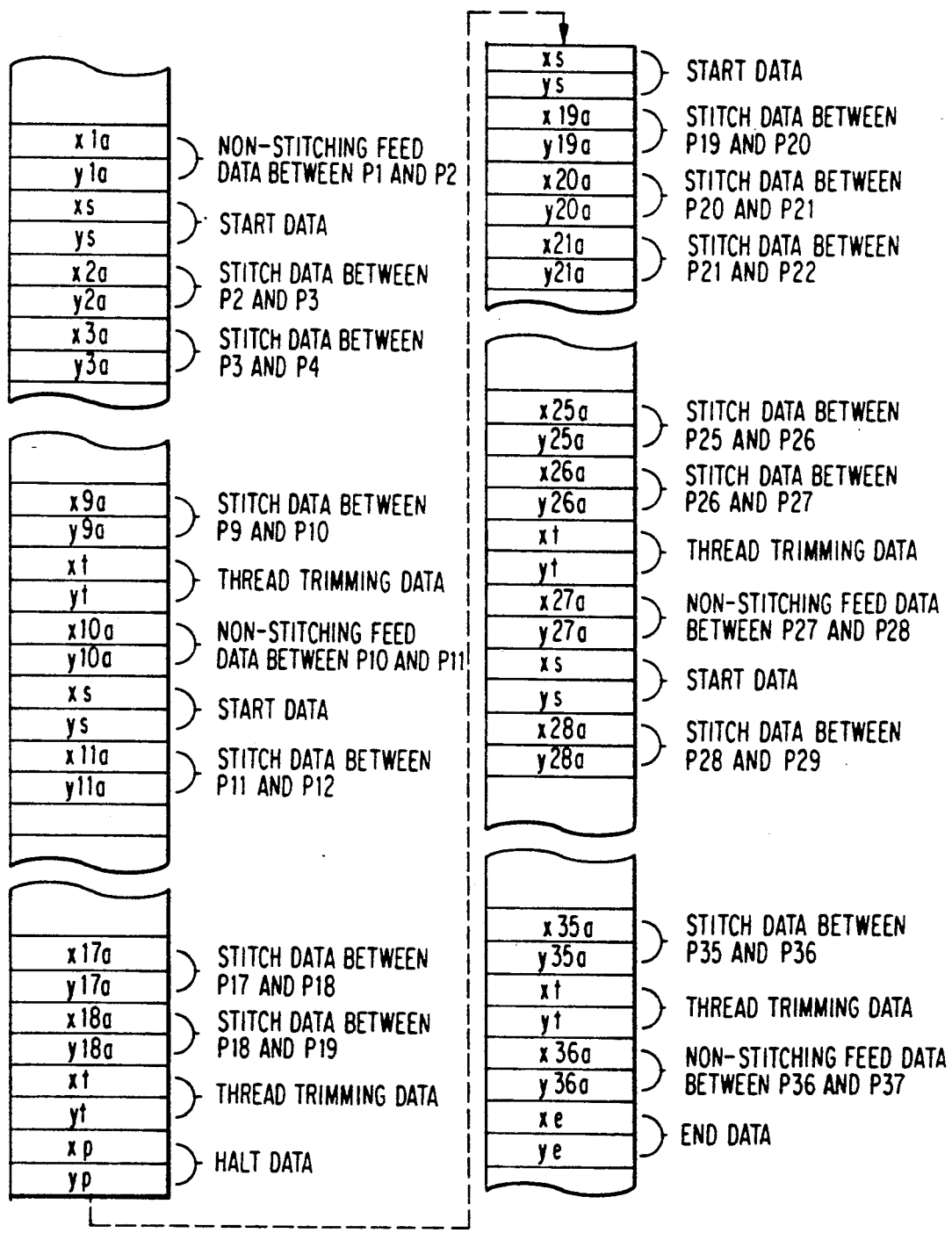
FIG. 10 illustrates how the pattern in FIG. 9 is stored in the memory RAM.

Since this data is stitch data (stitch position data), the operation branches to NO at each of the steps S23, S24 and S25 and progresses to the processing of step S26. At the step S26, the fourth conversion module 36 changes the signs of x and y in the read data set to their opposite settings to generate a set of reverse stitching data as new stitch data, and the data writer 38 writes it in the RAM 24. In FIG. 10, for example, the signs of the data set ($x_{18a}$, $y_{18a}$) are changed to opposite settings ($-x_{18a}$, $-y_{18a}$), and written to an area of the stitch data set ($x_{19a}$, $y_{19a}$) along $\overline{P19\ P20}$ shown in FIG. 10.

When this processing is complete, the operation returns again to the step S22, where the further preceding data set ($x_{17a}$, $y_{17a}$) is read and converted as described previously, and the converted stitching data ($-x_{17a}$, $-y_{17a}$) is written as stitch data along $\overline{P20\ P21}$.

This processing is repeated sequentially. If there is start data ($x_s$, $y_s$) midway through the stitch data, the analyzer 31 performs the required judgement processing (S24) and causes a branch to YES, whereby the second conversion module 34 converts the start data ($x_s$, $y_s$) into thread trimming data ($x_t$, $y_t$), which is then written into the RAM 24 in step S27. If thread trimming data ($x_t$, $y_t$) is present, the analyzing means 31 performs the required judgement processing S25 and causes a branch to YES, whereby the third conversion module 35 converts the thread trimming data ($x_t$, $y_t$) to start data ($x_s$, $y_s$), which is then written into the RAM 24. Similar processing is performed thereafter and the reverse stitch data is generated up to the stitch data set ($x_{35a}$, $y_{35a}$) at point P36 shown in FIG. 9 and written into RAM 24 in order.

Figure 9:
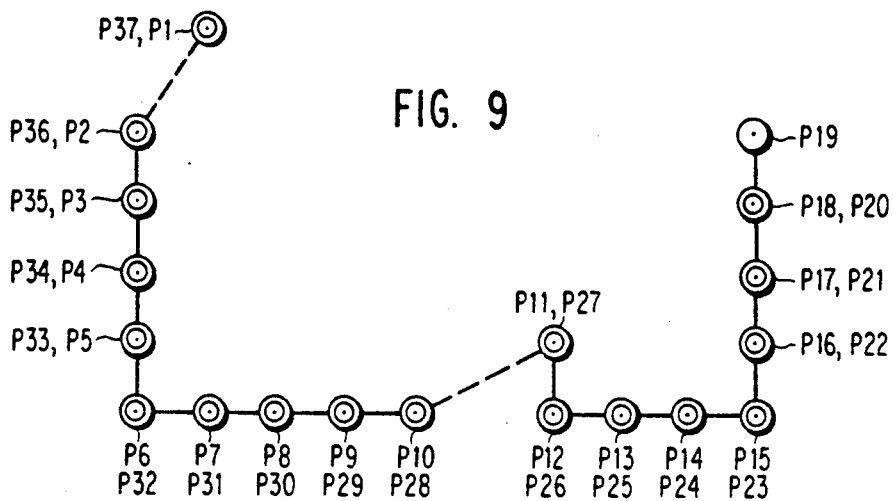
FIG. 9 illustrates an example of a stitch pattern for creating reverse stitching data.

The data set ($x_{35a}$, $y_{35a}$) is obtained by changing the signs of x and y in the data set ($x_{2a}$, $y_{2a}$) shown in FIG. 9 to their opposite settings. After the stitch set ($x_{2a}$, $y_{2a}$) has been processed, the next data set ($xx_{1a}$, $y_{1a}$) is read (S22), processing similar to that above is performed, and a data set ($x_{36a}$, $y_{36a}$) is produced. After the data set ($x_{1a}$, $y_{1a}$) has been processed, the next data set is read (S22). In this case, however, the data read from RAM 25 is vacant data. Hence, when the analyzer 31 judges whether data is present or absent (S23), it judges that no data exists and causes the operation to branch to YES, whereby end data ($x_e$, $y_e$) is written to the RAM 24

(S29) and the reverse stitching data creating procedure is terminated at step S30.

Figure 4:
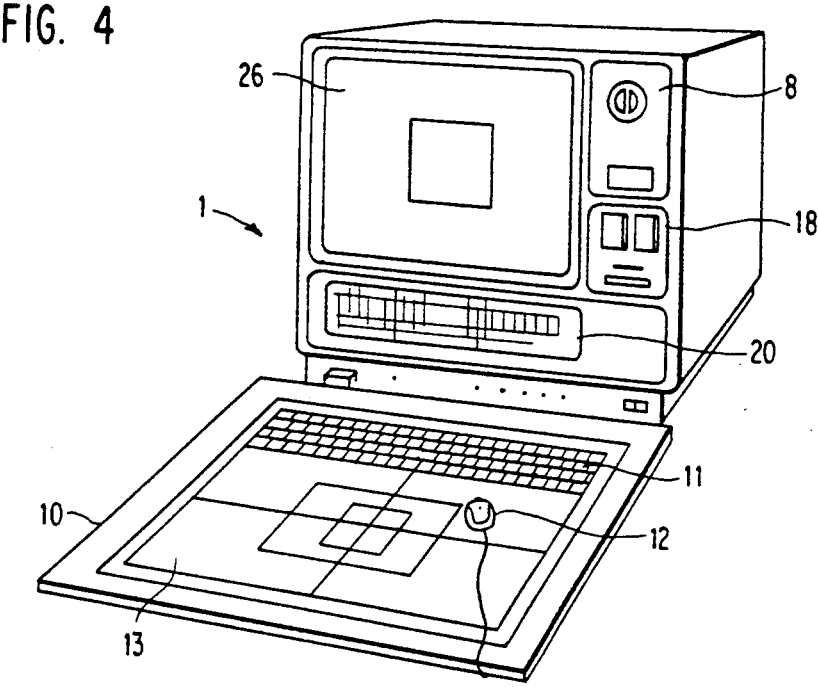
FIG. 4 is a perspective side view of a stitching data creating device for a sewing machine known in the prior art.
Figure 5:
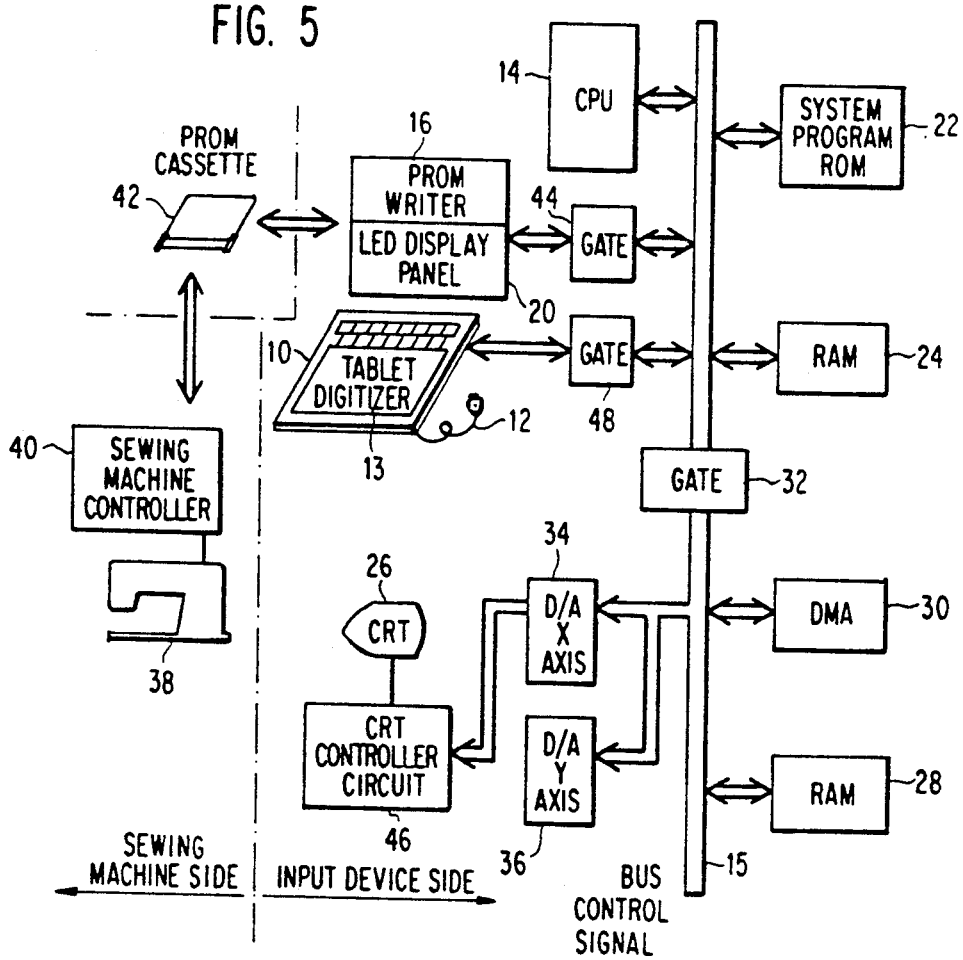
FIG. 5 is a block diagram illustrating a hardware configuration of the stitching data creating device in FIG. 4.
Figure 6:
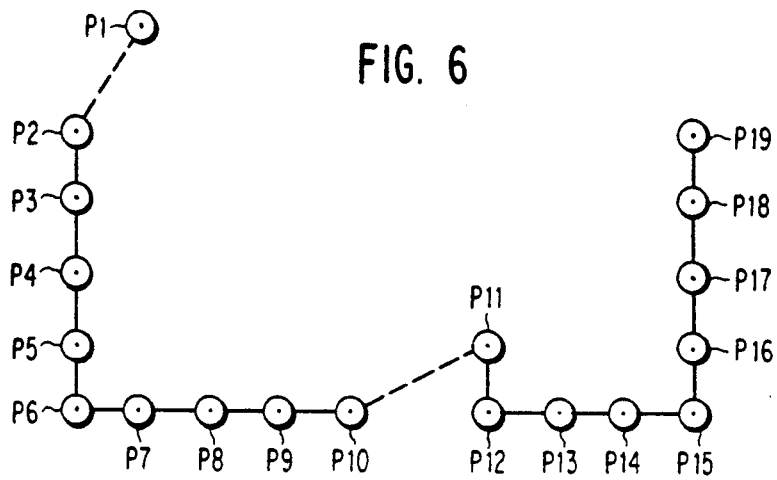
FIG. 6 illustrates an example of a stitch pattern.
Figure 7:
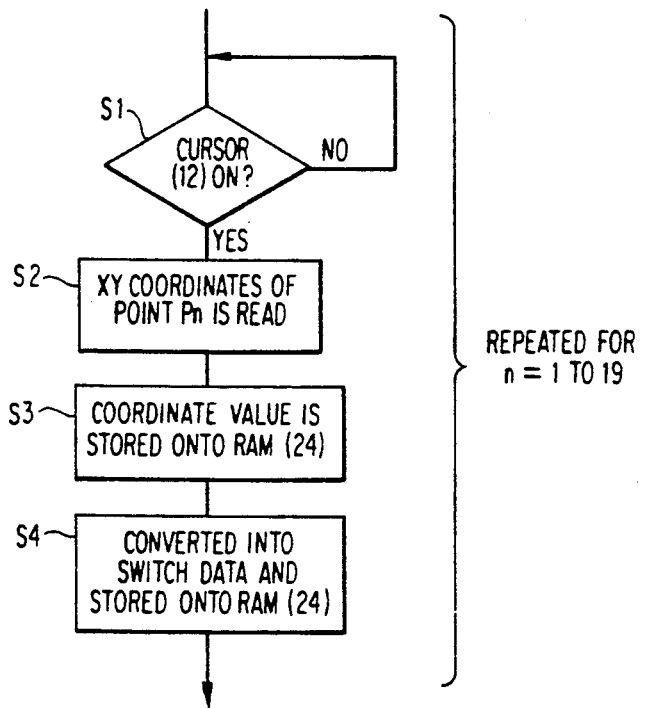
FIG. 7 is a flow chart indicating a sequence of operations of the prior art device.

In order to permit operator selection of this reverse process, the prior art device of FIG. 4 would be provided with a "REVERSE DATA" key (not illustrated) in a menu area 11 of a table digitizer 10, to permit an operator to command a reverse data operation. The use of a separate key is not essential to the present invention and many other ways of inputting this command would be obvious to one of ordinary skill in the art.

It should be apparent that, according to the present invention, the stitch data can be correctly produced by effectively utilizing the "one-way" data from stitch data $(x_{1a}, y_{1a})$ to $(x_{18a}, y_{18a})$ and $(x_t, y_t)$ shown in FIG. 9 and by automatically processing the start data $(x_s, y_s)$ and the thread trimming data $(x_t, y_t)$. Specifically, the start data $(x_s, y_s)$ and the thread trimming data $(x_t, y_t)$ following the halt data have been exchanged with each other. Thus, when reverse data is generated, the forward stitch data already stored in the storage device is read in reverse order by the reader, and during such reading operation, the end data $(x_e, y_e)$ is directly converted into the halt data $(x_p, y_p)$. The reverse data is also analyzed by the analyzer, and when judged to be start data $(x_s, y_s)$, the data is converted into thread trimming data $(x_t, y_t)$, and when judged to be thread trimming data $(x_t, y_t)$, it is converted into start data $(x_s, y_s)$. When the data is judged to be stitch data, i.e. stitch position data, its signs are changed to opposite settings, and when vacant data is detected, end data is generated. As described above, the data converted by the data conversion means is written in order into the storage means via the writing means, and the data shown in FIG. 10, for example, is obtained. As a result, reverse stitching data, i.e. data of the points P20, P21, ..., P36 and P37, with respect to the entered stitch pattern data (P1 to P19 in FIG. 9) may be automatically generated.

The aforementioned operation processing allows not only totally new reverse stitching data to be created but also allows reverse stitching data to be added to the already entered stitching pattern data easily in a short time.

It will be apparent that the invention, as described above, achieves a stitching data creating device for a sewing machine which functions to automatically convert thread trimming data and start data, respectively, existing midway through the stitch data, allows reverse stitching data to be automatically generated by simple operator instruction, and permits reverse stitching data to be entered in a length of time significantly less than the conventional entry method.

It will also be apparent that the device of the present invention makes use of entered position data as stitch data so that the reverse data will be without positional or other input error, so that sewing quality may be significantly improved.

What is claimed is:

1. A stitching data creating device comprising:
   means for inputting forward direction data including stitch data and control data for a stitch pattern, said control data comprising at least one of start data, end data, halt data, and thread trimming data;
   data storage means for storing said input forward direction stitch data and control data;
   data reading means for reading said stored data in reverse order, beginning with a final forward direction data for said stitch pattern stored in said storage means;
   analyzer means for judging that the data read by said reading means is any of start data, thread trimming data, stitch data and vacant data;
   data converter means for converting the stitch data for said stitch pattern into reverse stitching data; and
   data writing means for storing the data converted by said data converter means into said storage means in proper order.

2. The stitching data creating device of claim 1, wherein said data converter means comprises:
   a first converter for converting forward direction end data read from the storage means into halt data;
   a second converter for converting the read data into thread trimming data when the read data is judged to be start data;
   a third converter for converting the read data into start data when the read data is judged to be thread trimming data;
   a fourth converter for changing signs of the read data when the read data is judged to be stitch data; and
   a fifth converter for generating end data when the read data is judged to be vacant data.

3. A device for creating stitching data for a sewing machine including an input device for entering coordinate values and commands, and storage means for storing in an input order operational data for a stitching pattern comprising at least one of start data, thread trimming data, end data, stitch data and control data for the sewing machine generated by operating on the coordinate values entered in the input order from said coordinate input device, comprising:
   reading means for reading the stored data in an order reverse to said input order, beginning with a final data for said stitching pattern;
   analyzing means for judging that the data read from said reading means is any one of at least start data, thread trimming data, stitch data and vacant data;
   data converter means responsive to said analyzing means for converting at least one of said data read from said reading means into an appropriate type of data for a reverse sewing operation; and
   writing means for storing each data converted by said data converter means into said storage means.

4. The device of claim 3, wherein said data converter means comprises:
   first conversion means for converting end data read by said reading means into halt data;
   second conversion means for converting the read data into thread trimming data when that data is judged to be start data;
   third conversion means for converting the read data into start data when that data is judged to be the thread trimming data;
   fourth conversion means for changing signs of the read data when that data is judged to be stitch data; and
   fifth conversion means for generating end data when the read data is judged to be vacant data.

5. A device for creating stitching data for a sewing machine including an input device for entering coordinate values and commands, and storage means for storing in an input order operational data for a stitching pattern comprising at least start data, thread trimming data, end data, vacant data, stitch data and control data for the sewing machine generated by operating on the coordinate values entered from said coordinate input device, comprising:

reading means for reading the stored data in an order reverse to said input order, beginning with the final data for said stitching pattern;

analyzing means for judging that the data read from said reading means comprises start data, thread trimming data, stitch data or vacant data;

a data converter means responsive to said analyzing means for automatically converting the coordinates of each said stitch data to coordinates providing a reverse sewing direction, and converting others of said data to data appropriate for said reverse sewing direction; and writing means for storing each data converted by said data converter means into said storage means in order.

6. A method of generating stitching data for a sewing machine comprising:

generating forward stitching data including at least start-type data, thread trimming-type data, end-type data, and stitch-type data;

storing said data in a given order;

reading said stored data in an order opposite to said given order; p1 analyzing said read data to identify the type of data; and converting said read data on the basis of said identified type of data.

7. The method of claim 6 wherein said converting step comprises at least one of:

converting end-type data into halt-type data;

converting start-type data to thread trimming-type data;

converting thread trimming-type data into start-type data; and converting vacant data into end-type data.

8. The method of claim 6 wherein said converting step comprises converting coordinates of said stitch data.

* * * * *